Sept. 1, 1959  J. F. RYAN, JR  2,902,048
BACK PRESSURE VALVE
Filed March 6, 1956
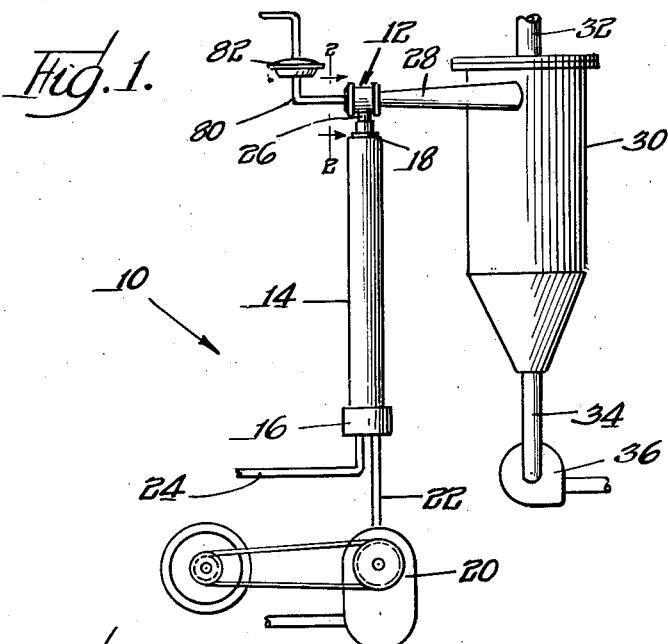
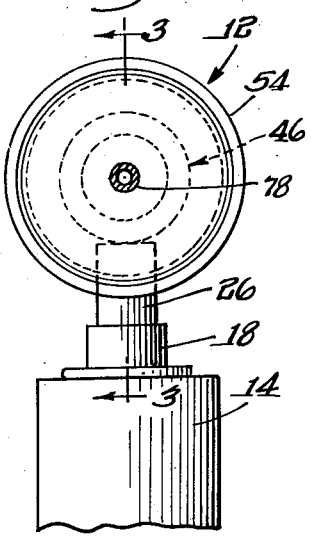
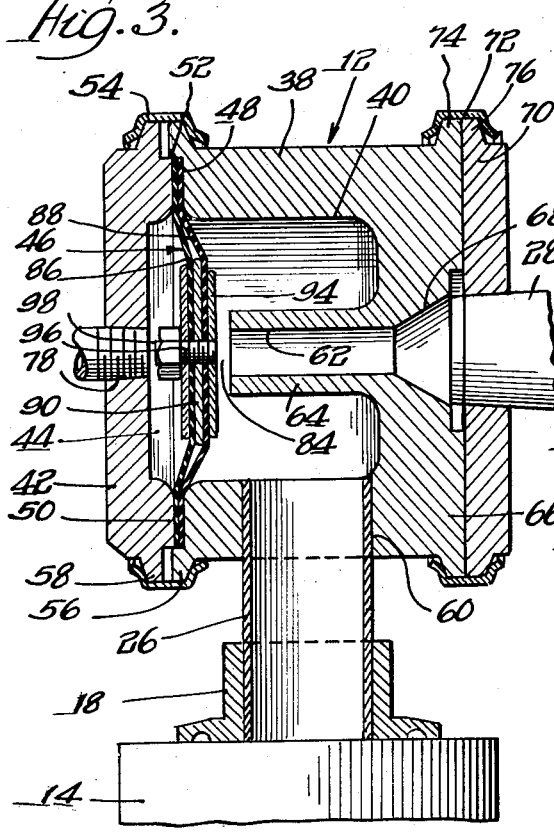
INVENTOR.
James F. Ryan, Jr.
Olson & Trexler
Attys.

2,902,048
BACK PRESSURE VALVE

James F. Ryan, Jr., Castro Valley, Calif., assignor to W. F. and John Barnes Company, Rockford, Ill., a corporation of Illinois Application March 6, 1956, Serial No. 569,812

2 Claims. (Cl. 137—510)

The present invention relates to a novel back pressure valve structure, and more particularly to a novel back pressure valve structure especially adapted for use in a continuous flow processing apparatus.

While various uses for the valve structure of the present invention will suggest themselves, it is especially adapted for and will be described with respect to its use in a system for processing or sterilizing a continuous flow of fluid material. It is contemplated that such a system will include elongated cylinder means having a fluid material inlet at one end and an outlet at its opposite end. The fluid material is delivered to the inlet end under pressure by suitable pump means or the like, and in addition, a heated processing fluid such as steam is delivered to the inlet end of the cylinder means for heating and processing or sterilizing the fluid material or product. In order to promote uniform processing or sterilizing of the product and to prevent damage to certain products, a back pressure valve is connected with the cylindrical means outlet for maintaining a back pressure in the cylindrical means which is sufficient to prevent the product from boiling or vaporizing.

It is an important object of the present invention to provide a novel back pressure valve structure capable of continuously and accurately maintaining a predetermined back pressure and having little or no time lag prior to responses to pressures imposed on the valve and capable of substantially eliminating any possible hunting of the back pressure.

A further object of the present invention is to provide a novel back pressure valve structure of the above described type which is of simple construction so that it may be relatively economically manufactured and maintained.

Other objects and advantages of the present invention will become apparent from the following description and the accompanying drawings wherein:

Fig. 1 is a somewhat diagrammatic view showing a portion of a fluid processing system incorporating a novel back pressure valve constructed in accordance with the present invention;

Fig. 2 is an enlarged fragmentary sectional view taken along line 2—2 in Fig. 1;

Fig. 3 is a further enlarged fragmentary sectional view taken along line 3—3 in Fig. 2; and Fig. 4 is a sectional view similar to Fig. 3 but showing a modified form of the present invention.

Referring now more specifically to the drawings wherein like parts are designated by the same numerals throughout the various figures, a portion of a fluid processing apparatus 10 is shown in Fig. 1 for illustrative purposes, which apparatus includes a back pressure valve 12 constructed in accordance with the present invention. It will be understood, however, that the back pressure valve 12 might well be used in various other systems.

The apparatus 10 is adapted to process or sterilize a fluid product, and may, for example, be utilized for sterilizing various food products such as soups, creams, or milk products. The apparatus 10 includes a cylindrical structure 14 having an inlet end 16 and an outlet end 18. A fluid product is delivered from a suitable source of supply, not shown, by a pump 20 and is forced under pressure through a pipe 22 into the inlet end of the cylindrical means 14. Steam or the like is also introduced into the inlet end of the cylindrical means through a pipe 24 for heating the product to a sterilizing temperature. The fluid flowing through the cylindrical means passes through an outlet conduit 26 and through the back pressure valve 12. From the back pressure valve, the fluid flows through a nozzle 28 and into a cooling and separating chamber 30 which has an exhaust conduit 32 connected with a source of reduced pressure, not shown. The processed fluid product collects at the bottom end of the chamber 30 and may be removed therefrom through an outlet conduit 34 and a pump 36 which directs the fluid toward any desired processing or filling equipment, not shown.

As shown best in Fig. 3, the back pressure valve assembly 12 comprises a main body member 38 having a cavity 40 therein, and a second body member 42 disposed across the open end of the body member 38 and having a cavity 44 therein. The cavities 40 and 44 are separated from each other by a slack diaphragm assembly 46 having a peripheral portion seating within an annular recess 48 provided in the body member 38 and clamped in position by an annular abutment portion 50 of the body member 42. The abutment portion 50 also at least slightly enters the recess 48 and engages an annular shoulder 52 of the body member 38 so as to maintain the two body members in axial alignment. The body members are clamped in assembled relationship by means of a ring 54 which is assembled over radially projecting flanges 56 and 58 of the body members 38 and 42 respectively.

The body member 38 is provided with a relatively large diameter fluid product inlet opening 60 connected with the pipe or conduit 26 and a relatively small diameter outlet passageway 62 extending through a protuberance 64 which projects from an end 66 of the body member 38 substantially into the chamber 40. The protuberance 64 extends substantially to the diaphragm assembly 46 so that the flow of the product through the chamber 40 and out through the passageway 62 is controlled by the diaphragm assembly which functions variably to restrict the product flow into the passageway in accordance with the position of the diaphragm assembly with respect to the end of the protuberance 64. The outlet passageway 62 has a flared discharge end 68 which communicates with the expanding nozzle 28. The nozzle is retained in assembled relationship with the valve body member 38 by a plate member 70 which is secured to the body member by a ring 72 assembled over flange portions 74 and 76 of the body member 38 and plate member 70 respectively.

As will be understood, the pressure of the fluid product flowing through the chamber 40 tends to urge the diaphragm assembly 46 away from the end of the protuberance 64 to permit the fluid to flow freely through the passageway 62. In order to control the position of the diaphragm assembly with respect to the protuberance 64 and, thus, the back pressure developed in the chamber 40 and the cylindrical means 14, a fluid such as air, gas, steam or water under pressure is admitted into the chamber 44 through an opening 78 connected with a fluid supply conduit 80. The conduit 80 is connected with any suitable source, not shown, of fluid under pressure, and a pressure regulating device 82 is connected in the conduit 80. The device 82 may be of any known construction capable of maintaining a substantially constant predetermined fluid pressure in the chamber 44. The opposing fluid pressures in the chambers 40 and 44 shift the diaphragm assembly 46 until the flow of the liquid product through the passageway 62 is such that the pressure in the chamber 40 balances the predetermined set pressure in the chamber 44 whereupon the diaphragm is positioned so as to balance the pressures or forces in equilibrium. As will be understood, the back pressure developed in the chamber 40 is proportional to the pressure in the chamber 44 so that the back pressure may be adjusted and controlled by adjusting and controlling the pressure in the chamber 44. Since no springs or the like act upon the diaphragm and the diaphragm is positioned solely in accordance with the pressures in the chambers, there will be practically no time lag in diaphragm response and the possibility of hunting of the diaphragm is substantially eliminated.

As the fluid product enters the passageway 62, an area of relatively low pressure is established between the diaphragm assembly and the inner end of the protuberance 64 as indicated at 84. As a result, the central portion of the diaphragm assembly tends to flex toward the protuberance 64 and further restrict the passageway 62 so that the back pressure in the remainder of the chamber 40 and in the cylindrical means 14 is increased and cannot be properly and accurately maintained within desired narrow limits. In order to eliminate flexing of the central portion of the diaphargm as a result of the low pressure area 84, means is provided for rigidifying the central portion of the diaphragm assembly. More specifically, the diaphragm assembly comprises a pair of flexible rubber or rubber-like diaphragms 86 and 88 having their peripheral portions clamped between the valve structure body members. The portions of the diaphragms 86 and 88 traversing the valve chambers are in a slack condition so that they will shift freely in accordance with the pressures in the chambers 40 and 44. A disc 90 formed from metal or any other suitable relatively rigid material is disposed between central portions of the diaphragms 86 and 88, and, in addition, similar rigidifying discs 92 and 94 are disposed at opposite sides of the diaphragms. The discs and the central portions of the diaphragms are clamped together as a rigid unit by suitable means such as a stud 96 welded or otherwise secured to the disc 94 and a nut 98 threaded onto the stud.

In Fig. 4 there is shown a back pressure valve 100 constructed in accordance with another embodiment of the present invention. This valve comprises a pair of body members 102 and 104 respectively having chambers 106 and 108 therein separated by a diaphragm assembly 110. The body members are clamped together to retain the peripheral margins of the diaphragm assembly and seal the chambers by a plurality of bolts 112 extending through and connected with plate members 114 and 116 overlying opposite ends of the body members 102 and 104 respectively. The body member 102 is provided with a fluid product inlet passageway 118 and an outlet passageway 120 extending through a protuberance 122, which passageways and protuberance correspond to the similar elements described above. Pressurized fluid for controlling the back pressure in the chamber 106 is admitted into the chamber 108 through a passageway 124.

The diaphragm assembly 110 comprises two layers 126 and 128 of rubber or rubber-like material having a reinforcing fabric base, which layers are bonded together. In addition, a relatively rigid disc 130 formed from steel or the like is disposed between central portions of the diaphragm layers.

While the preferred embodiments of the present invention have been shown and described herein, it is obvious that many structural details may be changed without departing from the spirit and scope of the appended claims.

The invention is claimed as follows:

1. A back pressure valve assembly comprising a first body member having a compartment therein opening at one end thereof, means providing an annular recess in said one end of said body member, slack flexible diaphragm means traversing said one end of said body member and having a peripheral portion disposed in said recess, a second body member providing a second compartment separated from said first compartment by said diaphragm means, said second body member having an annular abutment portion projecting into said recess for clamping said peripheral diaphragm portion against said first body member and for maintaining said body members in axial alignment, said body members respectively including peripheral outwardly projecting flanges adjacent said recess means and said abutment portion, ring means embracing said flanges and clamping said body members together, means providing a fluid inlet into said first compartment, means providing a fluid outlet from said first compartment, which outlet means has an annular inner end disposed adjacent to and restrictible by a central portion of said diaphragm means and substantially spaced inwardly from an end wall of said first compartment facing said diaphragm means, said diaphragm means including a pair of flexible members transversing said compartments, a plurality of rigid discs respectively positioned between and at opposite sides of central portions of said flexible members, and means clamping said discs together so as to prevent flexing of said central portions as a result of a low pressure area within said one compartment at said outlet, and means providing an inlet into said second compartment for admitting fluid under pressure into said second compartment, said diaphragm means being positioned with respect to said outlet in accordance with fluid pressures in said compartments.

2. A back pressure valve assembly comprising a first body member having a chamber therein opening at one end thereof, means providing an annular recess in said one end of said body member, slack flexible diaphragm means traversing said one end of said body member and having a peripheral portion disposed in said recess, a second body member providing a second chamber separated from said first chamber by said diaphragm means, said second body member having an annular abutment portion extending into said recess for clamping said peripheral diaphragm portion against said first body member and for maintaining said body members in axial alignment, said body members respectively including peripheral outwardly projecting flanges adjacent said recess means and said abutment portion, ring means embracing said flanges and clamping said body members together, means providing a relatively large diameter fluid inlet into the chamber of said first body member, means providing a relatively small diameter fluid outlet from said chamber of said first body member, which outlet means has a narrow annular inner end disposed adjacent to and restrictible by a central portion of said diaphragm means, said outlet means being substantially axially aligned with said diaphragm means and projecting axially inwardly from an end wall of said first body member facing said diaphragm means, a third body member disposed against said end wall and having opening means therethrough aligned with said outlet means and connectable with discharge conduit means, said first and third body members including adjacently disposed laterally projecting flange means, second ring means embracing said flange means and clamping said first and third body members together, and means providing an inlet into the chamber of said second body member for admitting fluid under pressure into said last mentioned chamber, said diaphragm means being positioned with respect to said outlet in accordance with fluid pressures in said chambers, and said diaphragm means including a flexible member traversing said chambers and a relatively rigid disc secured to a central portion of said flexible member so as to prevent flexing of said central portion as a result of a low pressure area within said first mentioned chamber at said outlet.

References Cited in the file of this patent

UNITED STATES PATENTS

| | | |
|---|---|---|
| 35,146 | Edson | May 6, 1862 |
| 1,524,217 | Small | Jan. 27, 1925 |
| 1,724,977 | Stein | Aug. 20, 1929 |
| 1,783,281 | Cox | Dec. 2, 1930 |
| 2,529,028 | Landon | Nov. 7, 1950 |
| 2,631,781 | Dillman | Mar. 17, 1953 |